United States Patent [19]

Babcock

[11] Patent Number: 5,354,469
[45] Date of Patent: Oct. 11, 1994

[54] LAYERED PLASMA POLYMER COMPOSITE MEMBRANES

[75] Inventor: Walter C. Babcock, Bend, Oreg.

[73] Assignee: Bend Research, Inc., Bend, Oreg.

[21] Appl. No.: 76,386

[22] Filed: Jun. 14, 1993

[51] Int. Cl.$^5$ .............................................. B01D 53/22
[52] U.S. Cl. ...................................... 210/490; 96/12; 210/492; 210/500.27
[58] Field of Search ...................... 210/500.27, 500.21, 210/488–490, 492; 55/16, 158; 96/10–13

[56] References Cited

U.S. PATENT DOCUMENTS

| | | | |
|---|---|---|---|
| 4,410,338 | 10/1983 | Yamamoto et al. | 96/10 |
| 4,594,079 | 6/1986 | Yamamoto et al. | 96/13 |
| 5,207,909 | 5/1993 | Abeles | 210/500.27 |

*Primary Examiner*—Frank Spear
*Attorney, Agent, or Firm*—Chernoff, Vilhauer, McClung & Stenzel

[57] ABSTRACT

Layered plasma polymer composite fluid separation membranes are disclosed, which comprise alternating selective and permeable layers for a total of at least 2n layers, where n is ≧2 and is the number of selective layers.

7 Claims, 1 Drawing Sheet

LAYERED PLASMA POLYMER COMPOSITE MEMBRANES

The government has a nonexclusive royalty-free license in this invention pursuant to Contract No. DE-FG03-92ER81423 awarded by the Department of Energy.

BACKGROUND OF THE INVENTION

Plasma polymer membranes, or those prepared by plasma polymerization, show great potential for commercial fluid separations because they can be made highly selective for the permeation of one species over another in a mixture. This high selectively is due to their highly crosslinked structure in which intermolecular spacings are rigidly maintained—thus creating holes through the polymer network of reasonably uniform size. Permeating molecules pass through the holes in the polymer network and the rate of permeation is greatly influenced by the size of the permeating molecules. This so-called "sieving mechanism" for molecular permeation is believed to be responsible for the very high selectivities that have been observed for some plasma-polymerized membranes.

Plasma polymer membranes are also potentially useful as barrier films to provide a seal against fluids such as water or air. In such cases, the polymer is prepared in such a way to exhibit a very dense and highly crosslinked impermeable structure. However, two major drawbacks have kept plasma polymer membranes from wide commercial application: (1) they tend to be brittle and highly prone to fracturing; and (2) they generally have low permeabilities and thus must be made exceedingly thin to obtain practical fluxes in separation applications.

The brittleness of plasma polymer membranes is due to their highly crosslinked structure and due to the plasma polymerization mechanism itself. This subject is discussed in detail by Yasuda in *Plasma Polymerization* Academic Press, New York, N.Y., 1985, and by Yasuda et al., in 46 *J. Membrane Sci.* 1 (1989). During the plasma polymerization process internal stresses build within the polymer film and increase with increasing film thickness. At some point, the internal stress within the film exceeds the cohesive strength of the plasma polymer and cracking occurs; or the adhesive strength between the plasma polymer film and the adjacent polymer film layer or a rigid substrate is exceeded and delamination occurs. The internal stress of plasma polymer films and their tendency to form cracks and other defects can be reduced by such factors as reducing the film thickness, the proper choice of monomer, and by selection of plasma polymerization conditions.

In the fabrication and use of practical separation devices using plasma polymer membranes, four principal modes of failure have been observed: (1) as prepared, the membranes contain defects or form cracks which result in the loss of selectivity or barrier properties; (2) the membranes are mechanically weak and are breached during handling or when subjected to pressure; (3) during their incorporation into modules such as in the preparation of spiral-wound modules which involves bending the membrane sheets around radii as small as 1 cm, delamination or cracking occurs; and (4) during operation the membranes flex due to the applied operating pressures of 100 psi or more and the membranes crack due to the repeated flexure.

Various solutions to the problems of brittle, physically weak, and defective plasma polymer membranes have been proposed. For mechanical strength, composite plasma polymer membranes are generally prepared by depositing the highly selective but physically weak plasma polymer film on a strong and highly permeable substrate. It has been recognized that plasma polymerization of a brittle and highly selective film directly on a porous substrate is undesirable because the films must be made relatively thick (approximately 5 times the pore diameter of the porous substrate) to completely bridge the surface pores. Such composite membranes exhibit unacceptably low flux and are prone to defects due to the thickness of the plasma polymer layer. Stancell and Spencer originally proposed a solution to this problem in 16 *J. Appl. Polym. Sci.* 1505 (1972) by preparing a thin plasma polymer layer on either side of dense, but highly permeable, conventional polymer films such as poly(phenylene oxide) or silicone-carbonate copolymer. Three-layer plasma polymer composite membranes comprising a microporous support membrane, a first dense and permeable layer such as silicone rubber or plasma-polymerized siloxane monomer, and a second thin and more selective plasma polymer layer are described in U.S. Pat. Nos. 4,483,901, 4,533,369, 4,696,686, and 4,976,856. A four-layer composite membrane is disclosed in U.S. Pat. No. 4,581,043, which is essentially the same as the three-layer composites just mentioned, except that an optional fourth permeable layer may be applied over the plasma polymer layer to seal defects therein and to provide protection from mechanical damage. U.S. Pat. No. 4,410,338 and Kramer et al., in 46 *J. Memb. Sci.* 1 (1989), both disclose three-layer composite gas separation membranes comprising two thin plasma polymer layers on a microporous support membrane, one of the layers being highly permeable, while the other is highly selective. Although the '338 patent discloses the fabrication of such composite membranes into modules, the highest oxygen-to-nitrogen selectivity reported is only 4.2. Buck et al., in 2 *Br. Polym. J.* 238 (1970), discloses a multi-layer plasma polymer RO membranes consisting of a porous support membrane, two consecutive coats of polyhexamethyldisiloxane and up to 15 consecutive coats of polyvinylene carbonate. However, flux through the membranes decreased dramatically with increasing layers, and there was no suggestion of alternating permeable and selective plasma polymer layers.

Another deficiency of previously disclosed multilayer plasma polymer membranes is that they frequently do not possess the high intrinsic selectivity of the selective plasma polymer layer. For example, Kawakami et al., in 19 *J. Membrane Sci.* 249 (1984), disclose membranes with plasma-polymerized layers over natural rubber and silicone rubber that exhibit calculated oxygen-to-nitrogen selectivities of up to 15.8 for the plasma layer, yet the actual measured selectivities of the composite membranes were only in the range of 3.1 to 5.8. It therefore appears that the previously reported multi-layer plasma polymer membranes either contained minor defects or were prepared in such a manner that the plasma polymer layer does not provide the majority of the overall membrane resistance and therefore does not substantially characterize the membrane's overall selectivity.

There therefore exists a need for improved multi-layer plasma polymer membranes that exhibit the high intrinsic selectivity of the plasma polymer layer and retain this high selectivity after bending and repeated pressurization and depressurization conditions that are common in the fabrication and use of commercial devices. This need is met by the present invention, which is summarized and described in detail below.

SUMMARY OF THE INVENTION

The invention comprises a flexible multi-layer plasma polymer membrane having alternating permeable dense nonporous layers and high selectivity layers. The membrane has a total number of layers equal to at least 2n, where n is the number of highly selective layers and is greater than or equal to 2. The individual membrane layers are thin and therefore flexible. By utilizing alternating dense and selective layers, the membrane is strong and resilient and minor defects that may be present in individual layers are effectively sealed and do not decrease the overall membrane selectivity. The cumulative thickness and permeability of the highly selective layers are controlled so that they dominate the membrane resistance to permeation and therefore control the overall membrane selectivity. The multi-layer membranes of the invention can be bent and pressure cycled under conditions that are encountered in commercial modularization and use while maintaining high selectivity or barrier properties.

DETAILED DESCRIPTION OF THE INVENTION

Figure 1:
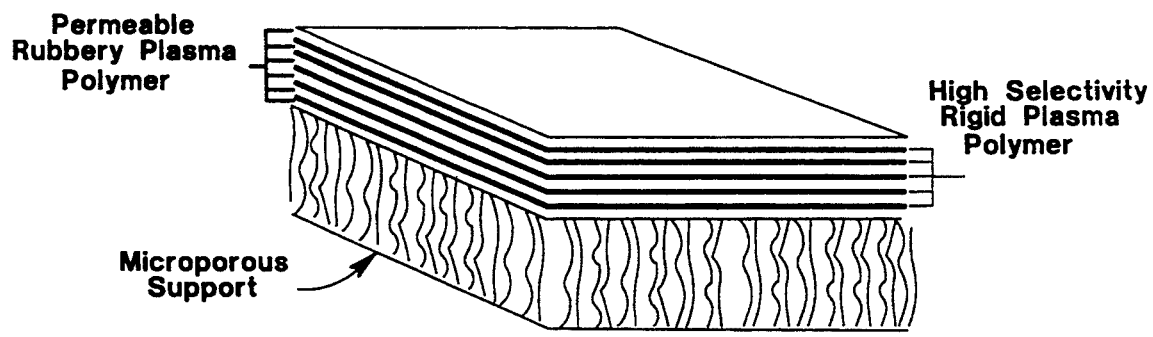
FIG. 1 is a schematic of a multi-layer plasma polymer composite membrane.

According to the present invention there are provided multi-layer plasma polymer membranes that are flexible and maintain their selectivity or barrier properties after bending around a radius smaller than 1 cm and after flexing due to repeated pressurization to pressures of 100 psig or more. The form of the membrane may be flat sheet, tubular or hollow fiber. The membranes are prepared by forming alternate layers of permeable and selective polymer films where the selective layers, and alternatively, both the selective and permeable layers, are prepared by plasma polymerization. Individual layers of the membranes are thin and therefore more flexible than thicker membrane layers. The permeable layers of the membranes are also generally less brittle than the selective layers and therefore support the selective layers and increase the overall strength of the membranes. Finally, the membranes are more resistant to minor defects that may form in individual selective layers because the defects in adjacent selective layers have very low probability of being in alignment. In this situation the non-selective flow of permeating species through minor defects must follow a tortuous path through the laminated film, thus diminishing the flow through defects and minimizing the effect on selectivity or barrier properties.

The layered membranes have an initial permeable layer that is dense and nonporous, and a total number of layers equal to at least 2n, where n is the number of selective layers. For purposes of this invention, a permeable layer is defined as possessing a permeability that is at least twice the permeability of the adjacent selective layers. A selective layer is defined as having a selectivity for one permeating species over another that is at least 50% greater than the selectivity of the adjacent permeable layers.

The overall permeability of the layered membranes described by this invention is given by:

$$L_T/P_{xo} = \sum_{i=i}^{j} L_i/P_{xi} \qquad (I)$$

where $L_T$ is the total thickness of the dense membrane layers, $P_{xo}$ is the overall membrane permeability to permeating species, x, $L_i$ is the thickness of layer i, and $P_{xi}$ is the permeability of layer i to species x. For the simple case where the permeable layers are the same polymer material and the selective layers are the same, the permeability equation is:

$$L_T/P_{xo} = L_p/P_{xp} + L_s/P_{xs} \qquad (II)$$

where the subscripts p and s refer to the permeable and selective layers, respectively. The overall selectivity ($\alpha$) of multi-layer membranes takes the usual form of the permeability ratio:

$$\alpha_{x/y} = P_{xo}/P_{yo} \qquad (III)$$

where $P_{xo}$ and $P_{yo}$ refer to the overall permeability of the multi-layer membrane to permeating species x and y, respectively.

An important parameter of composite membrane performance is the resistance of the selective membrane layers. When the selective membrane layers dominate the total permeation resistance of the membrane, the overall membrane selectivity is close to the selectivity of the selective layers. However, when the ratio of selective layer thickness to permeable layer thickness is decreased, or the permeability of the selective layer is high, the overall selectivity of the layered membrane approaches that of the permeable layers. Therefore, to obtain layered membranes with high selectivity, the cumulative thickness of the selective layers must be kept high enough to dominate the total membrane resistance to permeation.

The percent resistance of the selective layers to the total membrane resistance for permeation of species x (% $R_x$) is given by:

$$\% R_x = \frac{100 (Jx_p)}{Jx_p + Jx_s} \qquad (IV)$$

or $$\% R_x = \frac{100 \times \left(\sum_{i=k}^{l} \frac{P_{xpk}}{L_{pk}}\right)}{\sum_{i=k}^{l} \frac{P_{xpk}}{L_{pk}} + \sum_{i=m}^{n} \frac{P_{xsm}}{L_{sm}}} \qquad (V)$$

where $Jx_p$ and $Jx_s$ are the fluxes of species x in the permeable and selective layers, respectively.

The membranes of this invention can be produced as described in Examples 2 and 6–13 below; Examples 1 and 3–5 are comparative.

EXAMPLE 1

Figure 2:
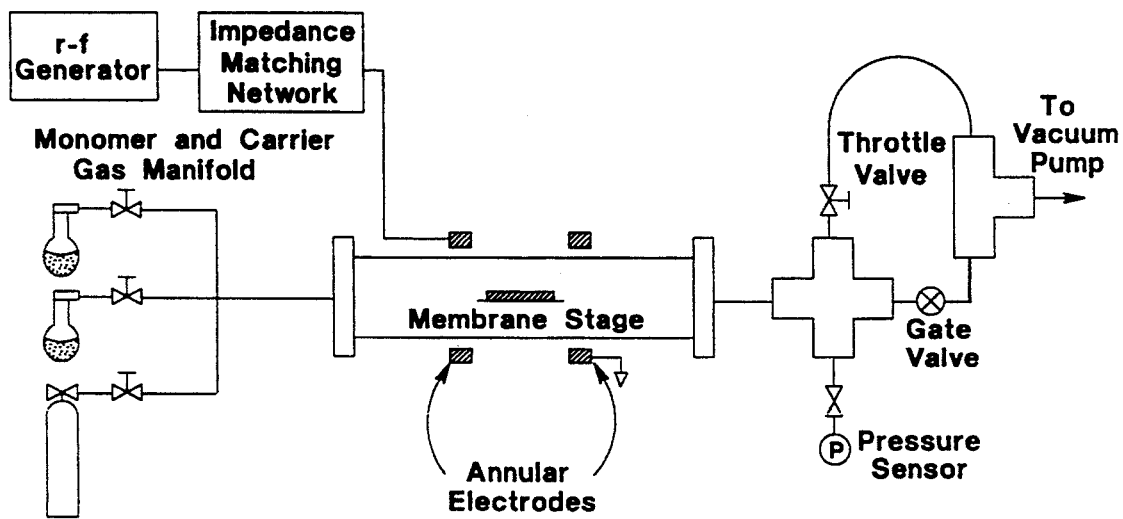
FIG. 2 is a schematic of an exemplary plasma polymer reactor.

A single-layer plasma polymer membrane was prepared by coating the surface of a polysulfone microporous support membrane with a highly permeable plasma polymer film. The microporous support membrane was 200 microns thick and had a surface pore diameter of less than 0.05 micron. The support membrane was coated with a continuous plasma polymer film by placing it in a plasma polymerization reactor of substantially the same configuration as shown in FIG. 2. The reactor had a plasma zone enclosed by a borosilicate glass tube that was 61 cm long and had an inside diameter of 5.1 cm. The outside diameter of the reactor tube was 6.0 cm. The support membrane was supported on a glass screen suspended in the middle of the reactor tube between two copper ring electrodes that encircled the outside of the tube. The band width of the ring electrodes was 9 mm and the electrodes were spaced 12 cm apart. Monomeric hexamethyldisiloxane (HMDS) vapor was admitted to one end of the tubular reactor through a throttling valve at the rate of 0.20 $cm^3STP/min$ (sccm/min). The pressure within the reactor was maintained at 90 millitorr with a vacuum pump that was connected to the tube through a throttling valve at the opposite end of the tube from the monomer inlet. A plasma was established within the reactor tube in the space between the electrodes by applying RF power at 10 watts through the electrodes from a 13.56 MHz power source. The plasma was maintained for 82 minutes to deposit a uniform poly(HMDS) coating approximately 0.8 micron in thickness on the surface of the microporous polysulfone support membrane. The so-fabricated composite membrane was removed from the reactor and tested for its capability to separate oxygen from nitrogen, and proved to have an initial oxygen-to-nitrogen separation factor of 2.9 and an initial oxygen flux of 7.7 $SCFH/ft^2$-100 psi ($1.3 \times 10^{-4}$ $cm^3sec \cdot cm^2 \cdot cmHg$). The oxygen permeability of the plasma polymer film was 100 barrer.

EXAMPLE 2

A ten-layer plasma polymer membrane was prepared by coating the surface of the microporous support membrane described in Example 1 with alternating layers of permeable dense nonporous and selective plasma polymer films. A first permeable layer was prepared with HMDS under the same conditions described in Example 1, except the plasma was maintained for 103 minutes to produce an initial poly(HMDS) layer that was 1.0 micron thick. A 0.10 micron thick selective layer was then prepared over the initial poly(HMDS) layer by closing the throttle valve to the HMDS monomer reservoir and opening the throttle valve to a vinyltrimethylsilane (VTMS) monomer reservoir, to form a poly(VTMS) layer. The flow rate of VTMS monomer vapor was maintained at 0.20 sccm/min and the pressure was maintained at 90 millitorr. A plasma was established by applying RF power at 50 watts to the electrodes for 6.7 minutes. A second permeable poly(HMDS) layer 0.1 micron thick was then laid down over the poly(VTMS) layer by closing off the throttle valve to the VTMS reservoir, opening the conditions used to prepare the initial HMDS layer except that the plasma was maintained for only 10 minutes. A total of seven more layers, alternating between selective poly(VTMS) and permeable poly(HMDS), each 0.10 micron thick, were then prepared by repeating the steps described above for the second and third layers. Using this procedure, a 10-layer membrane having five permeable layers and five selective layers for a total thickness of 1.9 microns for the plasma polymer layers with a top selective layer of poly(VTMS) was fabricated. The so-fabricated membrane was removed from the reactor and tested for its capability to separate oxygen from nitrogen, and proved to have an initial oxygen-to-nitrogen separation factor of 8.5 and an initial oxygen flux of 0.74 $SCFH/ft^2$-100 psi ($1.2 \times 10^{-5}$ $cm^3sec \cdot cm^2 \cdot cmHg$). The oxygen-to-nitrogen selectivity and oxygen permeability of the poly(VTMS) layers of this membrane were calculated to be 9.8 and 6 barrers, respectively, with the poly(VTMS) layers providing 88% of the resistance to nitrogen permeation.

EXAMPLE 3

Example 2 was substantially repeated with the exception that a two-layer plasma polymer membrane was prepared by coating the microporous support membrane with an initial poly(HMDS) permeable layer 1.4 microns thick and then depositing a poly(VTMS) selective layer 0.5 micron thick. The initial poly(HMDS) layer and the selective poly(VTMS) layer were both prepared using the same conditions as in Example 2, except that the RF power was applied for 144 minutes for the poly(HMDS) layer and 33 minutes for the poly(VTMS) layer. The total thickness for the plasma polymer layers was 1.9 microns. The so-fabricated membrane exhibited an oxygen-to-nitrogen separation factor of only 5.1 and an oxygen flux of 1.2 $SCFH/ft^2$-100 psi ($2.0 \times 10^{-5}$ $cm^3/sec \cdot cm^2 \cdot cmHg$). These test results indicate an 85% reduction in the separation performance of the selective poly(VTMS) layer relative to the theoretical performance of the individual permeable and selective layers determined from the results in Examples 1 and 2 and using equations II and IV above.

EXAMPLE 4

Example 3 was substantially repeated except that the initial poly(HMDS) permeable layer was 1.0 micron thick and the poly(VTMS) layer was 0.1 micron thick. The initial poly(HMDS) layer and second poly(VTMS) layer were prepared using the same conditions as in Example 3, except that the RF power was applied for 103 minutes for the poly(HMDS) layer and 6.7 minutes for the poly(VTMS) layer. The total thickness for the plasma-polymerized layers was 1.1 microns. The so-fabricated membrane exhibited an oxygen-to-nitrogen separation factor of only 5.1 and an oxygen flux of 1.1 $SCFH/ft^2$-100 psi ($1.8 \times 10^{-5}$ $cm^3/sec \cdot cm^2 \cdot cmHg$). The theoretical calculated oxygen-to-nitrogen separation factor is 7.1 based on the intrinsic performance of the HMDS and VTMS layers measured in Examples 1 and 2. The actual test results, indicating a separation factor of 5.1, indicate a 20% reduction in the separation performance of the selective poly(VTMS) layer, thus indicating the development of leaks in the selective layer.

EXAMPLE 5

A three-layer membrane was prepared by substantially repeating Example 4 with the exception that a second permeable poly(HMDS) layer that was 0.1 micron thick was deposited on top of the selective poly(VTMS) layer. The initial poly(HMDS) layer and the poly(VTMS) layer were prepared using the same conditions as in Example 4. The second poly(HMDS) layer was prepared using the same conditions as for the first poly(HMDS) layer except that the RF power was applied for only 10 minutes. The total thickness for the plasma polymer layers was 1.2 microns. The so-fabricated membrane exhibited an initial oxygen-to-nitrogen separation factor of 9.9 and an oxygen flux of 0.52 $SCFH/ft^2$-100 psi ($8.5 \times 10^{-6}$ $cm^3/sec \cdot cm^2 \cdot cmHg$).

EXAMPLE 6

A four-layer membrane was prepared by substantially repeating Example 5 with the exception that a second poly(VTMS) layer 0.1 micron thick was deposited on top of the second poly(HMDS) layer. The first three layers were prepared using the same conditions as in Example 5. The total thickness for the plasma polymer layers was 1.3 microns. The so-fabricated membrane exhibited an initial oxygen-to-nitrogen separation factor of 9.0 and an oxygen flux of 0.51 SCFH/ft$^2$-100 psi ($8.4 \times 10^{-6}$ cm$^3$/sec·cm$^2$·cmHg).

Test results for the mechanical strength and flexibility of the membranes described in Examples 1 through 6 are summarized in Table 1. All of the membranes were prepared with the same type of microporous polysulfone support membrane, and they had an initial 0.8 to 1.4 micron thick poly(HMDS) layer to support subsequent plasma polymer layers. To test their mechanical strength, the multi-layer membranes were subjected to 100 pressure cycles, in succession, of 0 psig to 50 psig, 0 psig to 75 psig, and then 0 psig to 100 psig. Between each range of 100 pressure cycles the membranes were evaluated for their ability to separate oxygen from nitrogen. The flexibility of the membranes was then evaluated by bending them around a 2 cm radius and then retesting the membranes for their ability to separate oxygen from nitrogen. Membranes that retained their selectivity after bending around a 2 cm radius were then bent around a 1 cm radius and then a 0.5 cm radius.

TABLE 1

| Ex. No. | Number Layers | Total Layered Thickness* | Oxygen Flux** | Oxygen-to-Nitrogen Selectivity | | | | | |
|---|---|---|---|---|---|---|---|---|---|
| | | | | After Pressurization 100 Cycles (psig) | | | After Bending Bend Radius (cm) | | |
| | | | | 0–50 | 0–75 | 0–100 | 2.0 | 1.0 | 0.5 |
| 1 | 1 | 0.8 | 7.7 (1.3) | 2.9 | 3.0 | 3.0 | — | — | — |
| 2 | 10 | 1.9 | 0.74 (0.12) | 8.5 | 8.6 | 8.9 | 8.8 | 8.9 | 8.9 |
| 3 | 2 | 1.9 | 1.2 (0.20) | 5.1 | 5.1 | 4.8 | 3.0 | — | — |
| 4 | 2 | 1.1 | 1.1 (0.18) | 5.1 | 5.1 | 5.1 | 5.3 | 3.5 | 2.7 |
| 5 | 3 | 1.2 | 0.52 (0.085) | 9.9 | 5.8 | 3.9 | 3.0 | 3.1 | 3.0 |
| 6 | 4 | 1.3 | 0.51 (0.084) | 9.0 | 8.8 | 8.9 | 8.8 | 7.7 | 3.3 |

*microns
**SCFH/ft$^2$-100 psi ($10^{-4}$ cm$^3$/sec · cm$^2$ · cmHg)

Test results show that the high-permeability single-layer membrane described in Example 1 has high mechanical strength and retained its selectivity through pressure cycling to 100 psig. Therefore, HMDS films prepared under the conditions described in these examples can be expected to give mechanical strength to layered membranes.

The ten-layer membrane described in Example 2 shows high selectivity for oxygen over nitrogen and retained this high selectivity after pressure cycling to 100 psig and after bending to 0.5 cm bend radius. Devices based on these multi-layer plasma polymer membranes can therefore be expected to show high separation or barrier performance under practical operating conditions.

Pressurization and bending tests on the two-layer membrane described in Example 3 show the utility of multi-layer (four layers and greater) plasma polymer membranes. The two-layer membrane of Example 3 shows much lower initial selectivity than the ten-layer membrane of Example 2 even though these membranes have equal cumulative thicknesses of the individual nonporous and selective layers. The low selectivity of the two-layer membrane degrades even further with pressure cycling and bending; after bending around a 2 cm radius, it exhibits the low selectivity of the permeable poly(HMDS) layer and completely loses the selectivity of the poly(VTMS) layer.

The thinner two-layer membrane of Example 4 is similar to many prior art membranes that use a permeable polymer film to support a more selective polymer layer in composite membranes. While the intrinsic high selectivity of the selective layer is not completely utilized, the thinner membrane is somewhat more resistant to pressure cycling and moderate bending. However, the high selectivity of the poly(VTMS) layers is lost when the membrane is bent around radii of 1 cm or less, which are typical bending radii encountered in module fabrication.

The three-layer membrane of Example 5 is more analogous to prior art membranes tat use highly selective polymer films that are placed between a permeable support layer and a top defect-sealing layer. This membrane initially exhibited the intrinsic high selectivity of the poly(VTMS) layer, but the selectivity rapidly degraded to the performance of the poly(HMDS) layers after pressure cycling and bending to a 2 cm bend radius.

The four-layer membrane of Example 6 retained high selectivity for oxygen over nitrogen after pressure cycling to 100 psig and bending around a 2 cm bend radius.

EXAMPLE 7

A seven-layer membrane was prepared by substantially repeating Example 2, with the following exceptions: (1) the microporous support membrane was Celgard ® 2400 microporous polypropylene, which has a nominal pore diameter of 0.02 micron and a thickness of 25 microns; (2) the RF power was applied for 19 minutes for each permeable poly(HMDS) layer to produce a per-layer thickness of approximately 0.19 micron; (3) the monomer flow rate and pressure for VTMS was 0.21 sccm/min and 120 millitorr, respectively; and (4) the RF power was applied for 2.7 minutes for each poly(VTMS) layer to produce a per-layer thickness of approximately 0.047 micron. The total thickness for the plasma polymer layers was 0.88 micron, with four permeable layers of poly(HMDS), including the top and bottom layers, and with three alternating selective poly(VTMS) layers. The so-fabricated membrane exhibited an oxygen-to-nitrogen separation factor of 15 and an oxygen flux of 1.3 SCFH/ft$^2$-100 psi (2.1 10$^{-5}$ cm$^3$/sec·cm$^2$·cmHg).

EXAMPLE 8

A seven-layer membrane was prepared by substantially repeating Example 7, with the following exceptions: (1) the RF power was applied for 10 minutes for each poly(HMDS) layer to produce a per-layer thickness of 0.10 micron; (2) the monomer flow rate and pressure for VTMS was 0.20 sccm/min and 90 millitorr, respectively; and (3) the RF power was applied for 6.7 minutes for each poly(VTMS) layer to produce a per-layer thickness of 0.10 micron. The total thickness for the plasma polymer layers was 0.70 micron. The so-fabricated membrane exhibited an oxygen-to-nitrogen separation factor of 9.0 and an oxygen flux of 0.69 SCFH/ft$^2$-100 psi (1.5×10$^{-5}$ cm$^3$/sec·cm$^2$·cmHg).

EXAMPLE 9

A 13-layer membrane comprising seven permeable layers and six selective layers was prepared by substantially repeating Example 8 except that the RF power was applied for 9.6 minutes for each poly(HMDS) layer to produce a per-layer thickness of 0.093 micron, and the RF power was applied for 1.6 minutes for each poly(VTMS) layer to produce a per-layer thickness of approximately 0.023 micron. The total thickness for the plasma polymer layers was 0.79 micron, with top and bottom layers of poly(HMDS). The so-fabricated membrane exhibited an oxygen-to-nitrogen separation factor of 8.4 and an oxygen flux of 1.3 SCFH/ft$^2$-100 psi (2.1×10$^{-5}$ cm$^3$/sec·cm$^2$·cmHg).

EXAMPLE 10

A seven-layer membrane was prepared by substantially repeating Example 8 except that the RF power was applied for 46 minutes for each poly(HMDS) layer to produce a per-layer thickness of 0.45 micron, and the RF power was applied for 0.62 minutes for each poly(VTMS) layer to produce a per-layer thickness of 0.0093 micron. The total thickness for the plasma polymer layers was 1.83 microns. The so-fabricated membrane exhibited an oxygen-to-nitrogen separation factor of 4.9 and an oxygen flux of 2.3 SCFH/ft$^2$-100 psig 3.8×10$^{-5}$ cm$^3$/sec·cm$^2$·cmHg).

EXAMPLE 11

A seven-layer membrane was prepared by substantially repeating Example 8, with the following exceptions: (1) the RF power was applied for 21 minutes with a monomer pressure of 120 millitorr for each permeable poly(HMDS) layer to produce a per-layer thickness of 0.20 micron; (2) the highly selective layers were also prepared from HMDS at 50 watts RF power, 0.20 sccm/min monomer flow rate, and 160 millitorr pressure; and (3) the RF power was applied for 1.3 minutes for each highly selective poly(HMDS) layer to produce a per-layer thickness of 0.05 micron. The total thickness for the plasma polymer layers was 0.95 micron, with top and bottom layers of permeable poly(HMDS). The so-fabricated membrane exhibited an oxygen-to-nitrogen separation factor of 5.7 and an oxygen flux of 1.5 SCFH/ft$^2$-100 psi (2.5×10$^{-5}$ cm$^3$sec·cm$^2$·cmHg).

EXAMPLE 12

A seven-layer membrane was prepared by substantially repeating Example 11 with the following exceptions: (1) the RF power was applied for 10 minutes for each permeable poly(HMDS) layer to produce a per-layer thickness of 0.10 micron; (2) the highly selective layers were prepared from benzene vapor at 50 watts RF power, 0.40 sccm/min monomer flow rate, and 50 millitorr pressure; and (3) the RF power was applied for 2.0 minutes for each highly selective benzene layer to produce a per-layer thickness of approximately 0.025 micron. The total thickness for the plasma polymer layers was 0.49 micron, with top and bottom layers of poly(HMDS). The so-fabricated membrane exhibited an oxygen-to-nitrogen separation factor of 5.6 and an oxygen flux of 0.19 SCFH/ft$^2$-100 psi (3.1×10$^{-6}$ cm$^3$/sec·cm$^2$·cmHg).

The permeation resistance (% R$_{O2}$) of the selective layers (Select.) and the oxygen selectivity (O$_2$/N$_2$), as well as the layer thicknesses of the membranes of Examples 7 through 12 are summarized in Table 2.

TABLE 2

| Ex. No. | Monomer Perm. | Monomer Select. | Total Layers | Cumulative Layer Thickness* Perm. | Cumulative Layer Thickness* Select. | % R$_{O2}$ | Oxygen Flux** | O$_2$/N$_2$ |
| --- | --- | --- | --- | --- | --- | --- | --- | --- |
| 7 | HMDS | VTMS | 7 | 0.74 | 0.14 | 84 | 1.3 (2.1) | 15 |
| 8 | HMDS | VTMS | 7 | 0.40 | 0.30 | 96 | 0.69 (1.1) | 9.0 |
| 9 | HMDS | VTMS | 13 | 0.65 | 0.14 | 86 | 1.3 (2.1) | 8.4 |
| 10 | HMDS | VTMS | 7 | 1.8 | 0.03 | 31 | 2.3 (3.8) | 4.9 |
| 11 | HMDS | HMDS | 7 | 0.80 | 0.15 | 81 | 1.5 (2.5) | 5.7 |
| 12 | HMDS | Benzene | 7 | 0.40 | 0.09 | 99 | 0.19 (0.31) | 5.6 |

*micron
**SCFH/ft$^2$ · 100 psi (10$^{-5}$ cm$^3$/sec · cm$^2$ · cmHg)

The membrane of Example 7 exhibited very high oxygen-to-nitrogen selectivity. The calculated intrinsic oxygen-to-nitrogen selectivity and oxygen permeability of the poly(VTMS) layers of this membrane was 16.7 and 3.5 barrers, respectively. With a 1:5.3 thickness ratio of selective to permeable layers and oxygen permeability of 100 barrers for the permeable layers, the total resistance of the selective poly(VTMS) layers in this membrane towards oxygen permeation is 84%.

The membranes described in Examples 8 through 10 illustrate the effect of decreasing the thickness ratio of the selective layers to the permeable layers. In each of these membranes the selective layers and the permeable layers had the same permselectivity properties. The selective poly(VTMS) layers were calculated to have an oxygen-to-nitrogen selectivity of approximately 9.3 and an oxygen permeability of approximately 3.5 barrers. The permeable poly(HMDS) layers have a selectivity of only 3.0 and a permeability of 100 barrers. Decreasing the thickness ratio lowers the fractional resistance of the selective layers and the overall membrane selectivity is dominated by the permeable layers. As the fractional resistance of the selective layers approaches zero, the overall membrane selectivity will approach the intrinsic selectivity of the permeable layers. Decreasing the thickness ratio increases the permeate flux, but flux may also be increased while maintaining high selectivity if the thickness of both membrane layers is decreased and an optimum thickness ratio is used that results in high fractional resistance of the highly selective layers.

Example 11 illustrates that the same monomer may be used to prepare both the highly selective and permeable layers when it is plasma-polymerized under different conditions that yield highly selective and permeable plasma polymers. The calculated oxygen-to-nitrogen selectivity and oxygen permeability of the selective poly(HMDS) layers in this membrane were 6.5 and 4.5 barrers, respectively.

Example 12 illustrates that layered barrier films can be prepared with the proper choice of a selective layer with low permeability. Under certain conditions plasma polymer films prepared from benzene are known to possess a highly crosslinked polyolefin structure with low permeability. The calculated oxygen permeability of the benzene layers in Example 12 was only approximately 0.25 barrer. With this low permeability, even at low thickness ratios the selective layers easily dominate the overall resistance of the membrane and low permeate flux is obtained, thus making such films ideally suited as a barrier against the passage of oxygen.

The permselectivity of the layered membrane described in Example 7 toward nitrogen, methane, hydrogen, carbon dioxide, and propene is summarized in Table 3. The membrane exhibited high selectivity for carbon dioxide over methane. Due to the highly crosslinked structure of plasma polymer membranes, these membranes can be expected to retain their high selectivity at high gas pressures where conventional polymeric membranes lose selectivity due to plasticization effects.

pressure remained between 70 and 80 millitorr; and (3) the RF power was applied for 2.7 minutes for each poly(VTMS) layer to produce a per-layer thickness of 0.40 micron. The total thickness for the plasma polymer layers was 1.8 microns. The so-fabricated membrane exhibited an oxygen-to-nitrogen separation factor of 7.1 and an oxygen flux of only 0.02 SCFH/ft$^2$-100 psi ($3.3 \times 10^{-7}$ cm$^3$/sec·cm$^2$·cmHg), making it well-suited as an oxygen barrier film. The calculated selectivity, oxygen permeability, and resistance of the poly(VTMS) layers of this membrane were 7.1, 0.20 barrers, and 99.8%, respectively.

The permeation rate of benzene and toluene vapor through this membrane was measured in the following experiment. A nitrogen gas stream containing 422 ppm of benzene and 200 ppm of toluene was passed across the coated or layered side of the composite membrane at the rate of 442 sccm/min. The temperature and pressure of the gas stream were maintained at 93 psig and 20° C. The uncoated or support side of the membrane was maintained at 13 psig. The measured benzene and toluene fluxes were 0.3 SCFH/ft$^2$-100 psi ($4.9 \times 10^{-6}$ cm$^3$/sec·cm$^2$·cmHg) and 0.4 SCFH/ft$^2$-100 psi ($6.6 \times 10^{-6}$ cm$^3$/sec·cm$^2$·cmHg), respectively. These vapor fluxes are approximately three orders of magnitude below the typical flux through vapor-permeable membranes and thus demonstrate the barrier properties of the layered plasma polymer composite membrane of the present invention.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A laminated permselective membrane comprising alternating selective and permeable layers on a support membrane, said permeable layers having a permeability of at least twice the permeability of each adjacent selective layer, said selective layer having a selectivity of at least 50% greater than the selectivity of the adjacent permeable layer, at least 2n layers where n is $\geq 2$ and is the number of selective layers, the thickness of each layer is less than 5 microns, the selective layers are prepared by plasma polymerization, and wherein the cumulative resistance of said selective layers is greater than or equal to 50% of the overall membrane resistance to permeation.

2. The membrane of claim 1 wherein the thickness of

TABLE 3

| Gas Flux* | | | | | Selectivity | | | | |
|---|---|---|---|---|---|---|---|---|---|
| N$_2$ | CH$_4$ | H$_2$ | CO$_2$ | Propene | CH$_4$/N$_2$ | H$_2$/N$_2$ | H$_2$/CH$_4$ | CO$_2$/CH$_4$ | H$_2$/propene |
| 0.089 (1.5) | 0.26 (4.3) | 6.2 (100) | 4.0 (66) | 0.17 (2.8) | 2.9 | 70 | 24 | 15 | 36 |

*SCFH/FT$^2$ · 100 psi ($10^{-6}$ cm$^3$/sec · cm$^2$ · cmHg)

EXAMPLE 13

A seven-layer membrane was prepared by substantially repeating Example 7, with the following exceptions: (1) the RF power was applied for 16 minutes for each poly(HMDS) layer to produce a per-layer thickness of 0.16 micron; (2) during deposition of the poly(VTMS) layers the throttle valve between the reactor and vacuum pump was closed and the VTMS monomer each of said layers is between 0.005 and 2 microns.

3. The membrane of claim 1 wherein a permeable layer is immediately adjacent said support membrane.

4. The membrane of claim 3 wherein said support membrane has a thickness less than 1000 microns, an effective surface pore diameter of less than 0.2 micron, and a pressure-normalized flux of greater than 10 times the pressure-normalized flux of all of said layers.

5. The membrane of claim 1 wherein each of said permeable layers are prepared by plasma polymerization.

6. The membrane of claim 5 wherein each of said selective layers is prepared from vinyltrimethylsilane and each of said permeable layers is prepared from hexamethyldisiloxane.

7. The membrane of claim 1 wherein each of said selective layers has a permeability of less than 1 barrer.

* * * * *

UNITED STATES PATENT AND TRADEMARK OFFICE
CERTIFICATE OF CORRECTION

PATENT NO. : 5,354,469

DATED : October 11, 1994

INVENTOR(S) : Walter C. Babcock

It is certified that error appears in the above-indentified patent and that said Letters Patent is hereby corrected as shown below:

Col. 5, line 57: after "opening the" insert -- throttle valve to the HMDS reservoir, and repeating the --

Col. 6, line 4: after "(1.2 x $10^{-5}$ cm$^3$) insert -- / --

Col. 8, line 21: after art membranes, delete "tat" and insert -- that --

Col. 9, line 67: after SCFH/ft$^2$-100, delete "psig" and insert -- psi --

Signed and Sealed this

Seventeenth Day of January, 1995

Attest:

BRUCE LEHMAN

Attesting Officer        Commissioner of Patents and Trademarks